United States Patent
Onda

(10) Patent No.: US 10,752,750 B2
(45) Date of Patent: Aug. 25, 2020

(54) POLYESTER COMPOSITION AND ARTICLE PREPARED THEREFROM

(71) Applicant: SABIC GLOBAL TECHNOLOGIES B.V., Bergen op Zoom (NL)

(72) Inventor: Kayoko Onda, Tochigi (JP)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 152 days.

(21) Appl. No.: 15/525,157

(22) PCT Filed: Nov. 4, 2015

(86) PCT No.: PCT/IB2015/058532
§ 371 (c)(1),
(2) Date: May 8, 2017

(87) PCT Pub. No.: WO2016/075593
PCT Pub. Date: May 19, 2016

(65) Prior Publication Data
US 2017/0335085 A1    Nov. 23, 2017

Related U.S. Application Data

(60) Provisional application No. 62/079,092, filed on Nov. 13, 2014.

(51) Int. Cl.
*C08K 5/103* (2006.01)
*C08L 67/02* (2006.01)
(Continued)

(52) U.S. Cl.
CPC .............. *C08K 5/103* (2013.01); *C08L 67/00* (2013.01); *C08L 67/02* (2013.01); *F21S 41/36* (2018.01); *B29C 45/0001* (2013.01); *B29K 2067/003* (2013.01); *B29K 2067/006* (2013.01); *B29L 2031/30* (2013.01); *B32B 15/04* (2013.01); *B32B 15/08* (2013.01); *B32B 15/09* (2013.01); *B32B 2250/02* (2013.01); *B32B 2255/205* (2013.01); *B32B 2307/406* (2013.01); *B32B 2307/416* (2013.01); *B32B 2367/00* (2013.01); *B32B 2457/00* (2013.01); *B60Q 1/04* (2013.01); *B60Q 1/0408* (2013.01); *B60R 13/00* (2013.01); *C08G 63/12* (2013.01); *C08G 63/183* (2013.01); *C08K 3/32* (2013.01); *C08K 5/098* (2013.01); *C08K 2003/329* (2013.01); *C08L 2201/08* (2013.01); *C08L 2205/02* (2013.01);
(Continued)

(58) Field of Classification Search
None
See application file for complete search history.

(56) References Cited

U.S. PATENT DOCUMENTS 3,875,069 A * 4/1975 Worschech ............. B29C 33/60
                                                        508/482
4,157,990 A * 6/1979 Lindner .................. B29C 33/60
                                                        508/492
(Continued)

FOREIGN PATENT DOCUMENTS

GB        943 995 A    * 12/1963
GB      1 513 541 A    *  6/1978
(Continued)

OTHER PUBLICATIONS

"PubChem—163183—Hexanedioic acid—polymer" (https://pubchem.ncbi.nlm.nih.gov/compound/163183) (webpage retrieved May 21, 2019) (Year: 2019).*
(Continued)

*Primary Examiner* — Vivian Chen
(74) *Attorney, Agent, or Firm* — Cantor Colburn LLP

(57) ABSTRACT

A composition includes 100 parts by weight of poly(alkylene terephthalate) and 0.01 to 2 part by weight of a compound represented by Formula (1), a partially saponified derivative thereof, or a combination thereof, (1) wherein $R^1$, $R^2$, and n are defined herein. The composition, which excludes copolymers of an unsubstituted or substituted styrene and an unsaturated nitrile, is useful for molding articles with very smooth surfaces. For example, the composition can be used to mold directly-metallizable substrates for automotive headlight reflectors and bezels.

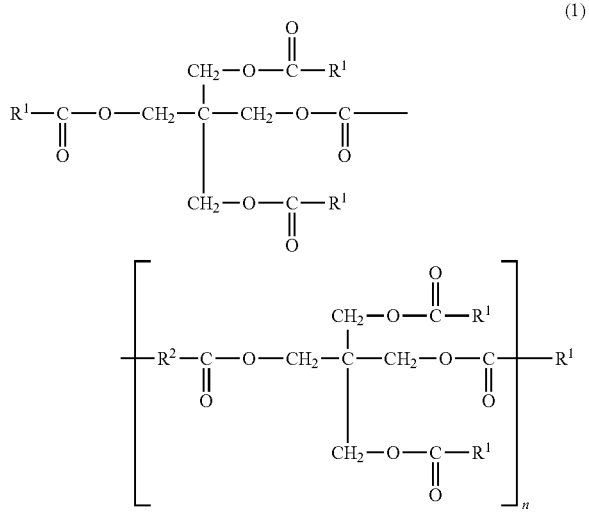

16 Claims, No Drawings

(51) Int. Cl.

| | | |
|---|---|---|
| *F21S 41/36* | (2018.01) | |
| *C08L 67/00* | (2006.01) | |
| *C08G 63/12* | (2006.01) | |
| *C08G 63/183* | (2006.01) | |
| *C08K 3/32* | (2006.01) | |
| *C08K 5/098* | (2006.01) | |
| *B32B 15/04* | (2006.01) | |
| *B32B 15/08* | (2006.01) | |
| *B32B 15/09* | (2006.01) | |
| *F21S 41/30* | (2018.01) | |
| *B60Q 1/04* | (2006.01) | |
| *F21S 41/20* | (2018.01) | |
| *B29C 45/00* | (2006.01) | |
| *B29K 67/00* | (2006.01) | |
| *B29L 31/30* | (2006.01) | |
| *B60R 13/00* | (2006.01) | |

(52) U.S. Cl.
CPC ....... *C08L 2205/06* (2013.01); *C08L 2666/18* (2013.01); *F21S 41/20* (2018.01); *F21S 41/30* (2018.01); *Y10T 428/31681* (2015.04); *Y10T 428/31786* (2015.04)

(56) References Cited

U.S. PATENT DOCUMENTS

| | | | | |
|---|---|---|---|---|
| 5,019,317 A * | 5/1991 | Slocum | C08G 18/10 | 264/300 |
| 5,232,967 A * | 8/1993 | Worschech | C08K 5/10 | 524/310 |
| 5,576,409 A * | 11/1996 | Mackey | C08G 18/6625 | 521/128 |
| 5,683,817 A * | 11/1997 | Kenmochi | B29C 45/0001 | 264/176.1 |
| 5,891,943 A * | 4/1999 | Katsumata | C08K 5/101 | 524/306 |
| 5,948,524 A * | 9/1999 | Seethamraju | B29B 9/14 | 428/326 |
| 5,998,005 A * | 12/1999 | Kanno | C08G 63/199 | 264/173.1 |
| 6,255,371 B1 * | 7/2001 | Schlosser | C08K 5/34928 | 252/609 |
| 6,602,927 B1 * | 8/2003 | Rothacker | C08G 18/092 | 521/128 |
| 6,605,665 B1 * | 8/2003 | Fischer | C08L 51/04 | 524/504 |
| 6,689,838 B1 * | 2/2004 | Fischer | C08L 67/02 | 525/230 |
| 7,816,431 B2 * | 10/2010 | Heath | C08J 5/10 | 264/211 |
| 8,148,489 B2 | 4/2012 | Peacock et al. | | |
| 8,304,478 B2 * | 11/2012 | Ting | C08K 5/103 | 524/318 |
| 8,524,806 B2 * | 9/2013 | Matthijssen | C08L 71/12 | 523/307 |
| 2004/0014851 A1 * | 1/2004 | Dohi | C08K 5/101 | 524/115 |
| 2005/0234171 A1 * | 10/2005 | Bos | C08K 5/103 | 524/315 |
| 2006/0091578 A1 * | 5/2006 | Bravo | B29C 48/022 | 264/122 |
| 2006/0094805 A1 * | 5/2006 | Heinrichs | C07C 69/30 | 524/284 |
| 2006/0100330 A1 * | 5/2006 | Natarajan | C08K 5/10 | 524/315 |
| 2007/0117897 A1 * | 5/2007 | Onda | C08K 5/098 | 524/394 |
| 2007/0254150 A1 * | 11/2007 | Seino | C08L 67/02 | 428/339 |
| 2007/0275242 A1 * | 11/2007 | Gopal | C08J 11/24 | 428/401 |
| 2007/0278462 A1 * | 12/2007 | Cohoon | C08L 67/02 | 252/602 |
| 2008/0039571 A1 * | 2/2008 | Cohoon | C08L 51/08 | 524/451 |
| 2008/0132630 A1 * | 6/2008 | Konduri | C08L 67/02 | 524/414 |
| 2008/0227920 A1 | 9/2008 | Weber et al. | | |
| 2008/0246181 A1 * | 10/2008 | Zhu | B82Y 30/00 | 264/239 |
| 2010/0324182 A1 * | 12/2010 | Ingroth | C08K 3/32 | 524/101 |
| 2011/0319534 A1 * | 12/2011 | Ding | C08L 67/02 | 524/100 |
| 2012/0246873 A1 * | 10/2012 | Konduri | B29C 45/1704 | 16/110.1 |
| 2013/0324646 A1 * | 12/2013 | De Campo | C01B 25/165 | 524/101 |
| 2016/0052927 A1 * | 2/2016 | Pfaendner | C07D 207/46 | 524/94 |
| 2017/0107375 A1 * | 4/2017 | Pfaendner | C09K 21/14 | |

FOREIGN PATENT DOCUMENTS

| | | |
|---|---|---|
| IT | 1340037 B1 | 6/2007 |
| JP | 08245829 A | 9/1996 |
| JP | 2006-117736 A * | 5/2006 |
| JP | 2006117736 | 5/2006 |
| JP | 2010215827 A | 9/2010 |
| WO | 2007111890 A | 10/2007 |

OTHER PUBLICATIONS

Database XP-002752869: Papp, Edward et al, "Nucleating Agent for injection molding of plastic materials", retrieved from STN Database accession No. 153:482182. Database CA (online) Chemical Abstract Service, Columbus, Ohio, and IT1340037BI (Bureau Voor Handelsbemiddeling and Commissiezaken Van Doom, Neth) Jun. 20, 2007.

International Search Report of the International Searching Authority for PCT/IB2015/058532 dated Jan. 22, 2016, 6 pages.

Written Opinion of the International Searching Authority for PCT/IB2015/058532 dated Jan. 22, 2016, 6 pages.

* cited by examiner

POLYESTER COMPOSITION AND ARTICLE PREPARED THEREFROM

This application is a national stage application of PCT/IB2015/058532, filed Nov. 4, 2015, which claims priority to U.S. Provisional Patent Application No. 62/079,092 filed Nov. 13, 2014, both of which are hereby incorporated by reference in their entirety.

BACKGROUND OF THE INVENTION

Polyester is a type of plastic having good moldability and heat resistance. These attributes, among others, make it useful for molding automotive headlight reflectors and bezels. However, manufacturers typically need to apply a primer coat before metallizing the molded reflectors and bezels, because existing polyester compositions form deposits on the mold during injection molding, and because reflectors and bezels made without a primer coat can exhibit distortion or "fogging" of the reflective layer at high operating temperatures. Eliminating the primer coating step would improve the manufacturing work environment and reduce the environmental impact of the manufacturing process, in particular by reducing solvent use. Accordingly, there is a desire for polyester compositions that eliminate the need for a primer coating step and facilitate direct metallization by providing injection molded articles with a reduced incidence of surface defects.

BRIEF SUMMARY OF EMBODIMENTS OF THE INVENTION

One embodiment is a composition comprising, based on total weight of poly(alkylene terephthalate), 100 parts by weight of poly(alkylene terephthalate); and 0.01 to 2 part by weight of a compound represented by Formula (1), a partially saponified derivative thereof, or a combination thereof

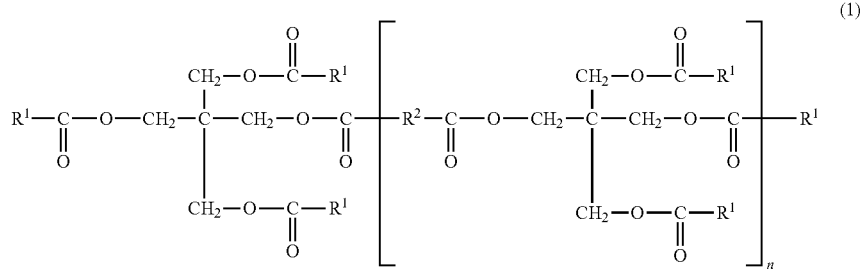

wherein each occurrence of $R^1$ is independently $C_6$-$C_{36}$ hydrocarbyl; each occurrence of $R^2$ is independently $C_1$-$C_{10}$ hydrocarbylene; and n is, on average, 1 to 15; and wherein the composition excludes copolymers of monomers comprising an unsubstituted or substituted styrene, and an unsaturated nitrile.

Another embodiment is an article comprising the composition.

These and other embodiments are described in detail below.

DETAILED DESCRIPTION OF THE INVENTION

The present inventors have determined that a polyester composition that includes a very specific mold release agent provides injection molded articles with a reduced incidence of surface defects. This is accomplished, in part, by reducing deposits that adhere to the mold. In some embodiments, the composition exhibits the additional benefit of reducing distortion or "fogging" of the reflective layer at high operating temperatures.

One embodiment is a composition comprising, based on total weight of poly(alkylene terephthalate), 100 parts by weight of poly(alkylene terephthalate); and 0.01 to 2 part by weight of a compound represented by Formula (1), a partially saponified derivative thereof, or a combination thereof

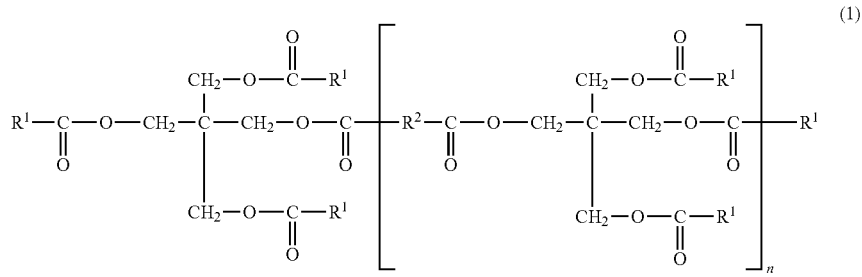

wherein each occurrence of $R^1$ is independently $C_6$-$C_{36}$ hydrocarbyl; each occurrence of $R^2$ is independently $C_1$-$C_{10}$ hydrocarbylene; and n is, on average, 1 to 15; and wherein the composition excludes copolymers of monomers comprising an unsubstituted or substituted styrene, and an unsaturated nitrile.

The composition comprises a poly(alkylene terephthalate). The alkylene group of the poly(alkylene terephthalate) can comprise 2 to 18 carbon atoms. In some embodiments, the alkylene group is selected from the group consisting of ethylene, 1,3-propylene, 1,4-butylene, 1,5-pentylene, 1,6-hexylene, 1,4-cyclohexylene, 1,4-cyclohexanedimethylene, and combinations thereof. In some embodiments, the alkylene group is selected from the group consisting of ethylene, 1,4-butylene, and combinations thereof.

In some embodiments, the poly(alkylene terephthalate) is semicrystalline, which is defined herein as a poly(alkylene terephthalate) having a degree of crystallinity of at least 10 weight percent.

The poly(alkylene terephthalate) can also be a copolyester derived from terephthalic acid (or a combination of terephthalic acid and up to 10 mole percent isophthalic acid) and a mixture comprising a linear $C_2$-$C_6$ aliphatic diol, such as ethylene glycol and/or 1,4-butylene glycol), and a $C_6$-$C_{12}$ cycloaliphatic diol, such as 1,4-cyclohexane diol, 1,4-cyclohexanedimethanol, dimethanol decalin, dimethanol bicyclooctane, 1,10-decane diol, or a combination thereof. The ester units comprising the two or more types of diols can be present in the polymer chain as random individual units or as blocks of the same type of units. Specific esters of this type include poly(1,4-cyclohexylene dimethylene co-ethylene terephthalate) (PCTG) wherein greater than 50 mole percent of the ester groups are derived from 1,4-cyclohexanedimethanol; and poly(ethylene-co-1,4-cyclohexylenedimethylene terephthalate) wherein greater than or equal to 50 mole percent of the ester groups are derived from ethylene (PETG).

It will be understood that the poly(alkylene terephthalate) can include small amounts (e.g., up to 10 weight percent, specifically up to 5 weight percent) of residues of monomers other than alkylene diols and terephthalic acid. For example, the poly(alkylene terephthalate) can include the residue of isophthalic acid. As another example, the poly(alkylene terephthalate) can comprises units derived from an aliphatic acid, such as succinic acid, glutaric acid, adipic acid, pimelic acid, 1,4-cyclohexanedicarboxylic acid, and combinations thereof.

In some embodiments, the poly(alkylene terephthalate) is selected from the group consisting of poly(ethylene terephthalate), poly(butylene terephthalate), and combinations thereof. In some embodiments, the poly(alkylene terephthalate) comprises poly(butylene terephthalate).

In some embodiments, the poly(alkylene terephthalate) is poly(1,4-butylene terephthalate) or "PBT" resin that is obtained by polymerizing a glycol component comprising at least 70 mole percent, specifically at least 80 mole percent, of tetramethylene glycol (1,4-butanediol), and an acid component comprising at least 70 mole percent, specifically at least 80 mole percent, terephthalic acid or polyester-forming derivatives therefore. Commercial examples of PBT include those available as VALOX™ 315 Resin and VALOX™ 195 Resin, manufactured by SABIC Innovative Plastics.

In some embodiments, the poly(alkylene terephthalate) has an intrinsic viscosity of 0.4 to 2.0 deciliter/gram (dL/g), as measured in a 60:40 phenol/tetrachloroethane mixture at 23° C. In some embodiments, the poly(alkylene terephthalate) has an intrinsic viscosity of 0.5 to 1.5 dL/g, specifically 0.6 to 1.2 dL/g.

In some embodiments, the poly(alkylene terephthalate) has a weight average molecular weight of 10,000 to 200,000 daltons, specifically 50,000 to 150,000 daltons, as measured by gel permeation chromatography (GPC) using polystyrene standards. If a poly(alkylene terephthalate) having a weight average molecular weight less than 10,000 daltons is used, the mechanical properties of the articles molded from the composition can be unsatisfactory. On the other hand, if a poly(alkylene terephthalate) having a weight average molecular weight greater than 200,000 daltons is used, the moldability can be insufficient. The poly(alkylene terephthalate) can also comprise a mixture of two or more poly(alkylene terephthalate)s having different intrinsic viscosities and/or weight average molecular weights.

In some embodiments, the poly(alkylene terephthalate) component comprises a modified poly(butylene terephthalate), that is, a PBT derived in part from poly(ethylene terephthalate) (PET), for example recycled PET from used soft drink bottles. The PET-derived PBT polyester (referred to herein for convenience as a "modified PBT") can be derived from a poly(ethylene terephthalate) component such as poly(ethylene terephthalate), a poly(ethylene terephthalate) copolymer, or a combination thereof. The modified PBT can further be derived from biomass-derived 1,4-butanediol, e.g., corn-derived 1,4-butanediol or a 1,4-butanediol derived from a cellulosic material. Unlike conventional molding compositions containing virgin PBT (PBT that is derived from 1,4-butanediol and terephthalic acid monomers), the modified PBT contains units derived from ethylene glycol and isophthalic acid. Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., carbon dioxide.

The modified PBT can have at least one residue derived from the poly(ethylene terephthalate) component. Such residue can be selected from the group consisting of ethylene glycol residues, diethylene glycol residues, isophthalic acid residues, antimony-containing residues, germanium-containing residues, titanium-containing residues, cobalt-containing residues, tin-containing residues, aluminum, aluminum-containing residues, 1,3-cyclohexane dimethanol residues, 1,4-cyclohexane dimethanol residues, alkali salts and alkaline earth metal salts including calcium and magnesium and sodium and potassium salts, phosphorous-containing residues, sulfur-containing residues, naphthalene dicarboxylic acid residues, 1,3-propanediol residues, and combinations thereof.

Depending on factors such as the types and relative amounts of poly(ethylene terephthalate) and poly(ethylene terephthalate) copolymers, the residue can include various combinations. For example, the residue can include mixtures of units derived from ethylene glycol groups and diethylene glycol groups. The residue can also include mixtures of units derived from ethylene glycol, diethylene glycol, and isophthalic acid. The residue derived from poly(ethylene terephthalate) and poly(ethylene terephthalate) copolymers can be selected from the group consisting of cis-1,3-cyclohexanedimethanol residues, cis-1,4-cyclohexane dimethanol residues, trans-1,3-cyclohexanedimethanol residues, trans-1,4-cyclohexanedimethanol residues, and combinations thereof. The residue can also include a mixture of units derived from ethylene glycol, diethylene glycol, isophthalic acid, cis-1,4-cyclohexane dimethanol, trans-1,4-cyclohexanedimethanol, or a combination thereof. The residue derived from poly(ethylene terephthalate) and poly(ethylene terephthalate) copolymers can also include mixtures of units derived from ethylene glycol, diethylene glycol, cobalt-containing compounds, and isophthalic acid.

The amount of the ethylene glycol groups, diethylene glycol groups, and isophthalic groups in the polymeric backbone of the modified PBT component can vary. The modified PBT ordinarily contains units derived from isophthalic acid in an amount that is at least 0.1 mole percent and can range from 0.1 to 15 mole percent. The modified PBT component can also contain units derived from ethylene glycol in an amount that is at least 0.1 mole percent and can range from 0.1 to 15 mole percent. The modified PBT component can also contain units derived from diethylene glycol in an amount of 0.1 to 15 mole percent. In some embodiments, the amount of units derived from 1,4-butanediol is 95 to 99.8 mole percent. In some embodiments, the amount of units derived from terephthalic acid is 90 to 99.9 mole percent. Unless otherwise specified, all molar amounts of units derived from isophthalic acid and/or terephthalic acid are based on the total moles of units in the composition derived from diacids and/or diesters. Unless otherwise specified, all molar amounts of units derived from 1,4-butanediol, ethylene glycol, and diethylene glycol are based on the total moles of units in the composition derived from diol.

The total amount of the poly(ethylene terephthalate) component residue in the modified PBT can vary in amounts from 1.8 to 2.5 weight percent, or from 0.5 to 2 weight percent, or from 1 to 4 weight percent, based on the total weight of the modified PBT. When it is desirable to make a poly(butylene terephthalate) copolymer having a melting temperature $T_m$ that is at least 200° C., the total amount of diethylene glycol, ethylene glycol, and isophthalic acid residues should be within a certain range. As such, the total amount of the diethylene glycol, ethylene glycol, and isophthalic acid residues in the modified poly(butylene terephthalate) component can be more than 0 and less than or equal to 23 equivalents, relative to the total of 100 equivalents of diol and 100 equivalents of diacid groups in the modified PBT. The total amount of inorganic residues derived from the poly(ethylene terephthalate) can be present at more than 0 parts per million by weight (ppm) and up to 1000 ppm. In some embodiments, the inorganic residues are selected from the group consisting of antimony-containing residues, germanium-containing residues, titanium-containing residues, cobalt-containing residues, tin-containing residues, aluminum-containing residues, aluminum salts, alkaline earth metal salts (including calcium and magnesium salts), alkali salts (including sodium and potassium salts), phosphorous-containing residues and anions, sulfur-containing residues and anions, and combinations thereof. The amounts of inorganic residues can be from 250 to 1000 ppm, more specifically from 500 to 1000 ppm.

Commercial examples of modified PBT resins include those available under the trade name VALOX™ iQ Resin, manufactured by SABIC Innovative Plastics Company. The modified PBT can be derived from the poly(ethylene terephthalate) component by any method that involves depolymerization of the poly(ethylene terephthalate) component and polymerization of the depolymerized poly(ethylene terephthalate) component with 1,4-butanediol to provide the modified PBT. For example, the modified poly(butylene terephthalate) component can be made by a process that involves depolymerizing a poly(ethylene terephthalate) and/or a poly(ethylene terephthalate) copolymer, with a 1,4-butanediol component at a temperature from 180° C. to 230° C., under agitation, at a pressure that is at least atmospheric pressure in the presence of a catalyst component, at an elevated temperature, under an inert atmosphere, to produce a molten mixture containing an oligomer containing ethylene terephthalate moieties, an oligomer containing ethylene isophthalate moieties, an oligomer containing diethylene terephthalate moieties, an oligomer containing diethylene isophthalate moieties, an oligomer containing butylene terephthalate moieties, an oligomer containing butylene isophthalate moieties, a covalently bonded oligomeric moiety containing at least two of the foregoing moieties, 1,4-butanediol, ethylene glycol, or a combination thereof; and agitating the molten mixture at sub-atmospheric pressure and increasing the temperature of the molten mixture to an elevated temperature under conditions sufficient to form a modified PBT containing at least one residue derived from the poly(ethylene terephthalate) component.

The composition can comprise a combination of virgin poly(alkylene terephthalate) and modified poly(alkylene terephthalate), including a combination of virgin and modified poly(1,4-butylene terephthalate), the latter obtained from recycled poly(ethylene terephthalate) as described above.

As the poly(alkylene terephthalate) forms the weight basis for all other components, it is always present in an amount of 100 parts by weight.

In addition to the poly(alkylene terephthalate), the composition comprises a compound represented by Formula (1), a partially saponified derivative thereof, or a combination thereof

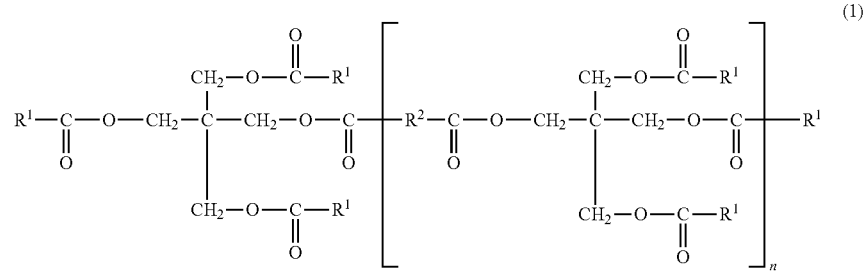

(1)

wherein each occurrence of $R^1$ is independently $C_6$-$C_{36}$ hydrocarbyl; each occurrence of $R^2$ is independently $C_1$-$C_{10}$ hydrocarbylene; and n is, on average, 1 to 15. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen.

As noted above, each occurrence of $R^2$ is independently $C_1$-$C_{10}$ hydrocarbylene. In some embodiments, each occurrence of $R^2$ is independently dimethylene ($-(CH_2)_2-$), trimethylene ($-(CH_2)_3-$), tetramethylene ($-(CH_2)_4-$), pentamethylene ($-(CH_2)_5-$), hexamethylene ($-(CH_2)_6-$), heptamethylene ($-(CH_2)_7-$), octamethylene ($-(CH_2)_8-$), nonamethylene ($-(CH_2)_9-$), or decamethylene ($-(CH_2)_{10}-$). In some embodiments, each occurrence of $R^2$ is tetramethylene ($-(CH_2)_4-$).

In Formula (1), each occurrence of $R^1$ is independently $C_6$-$C_{36}$ hydrocarbyl. In some embodiments, each occurrence of $R^1$ is independently $C_{16}$-$C_{36}$ alkyl. In very specific embodiments, each occurrence of $R^1$ is n-heptadecyl ($-(CH_2)_{16}CH_3$).

In Formula (1), the structural variable n is, on average, 1 to 15. In some embodiments, n is on average 4 to 12, specifically 6 to 8.

In addition to being a compound of Formula (1), the component can be a partially saponified derivative of the compound of Formula (1), or a combination of the compound of Formula (1) and a partially saponified derivative thereof. In a partially saponified derivative, at least one ester linkage (but not all of the ester linkages) is hydrolyzed to form an alcohol and a carboxylate salt. In some embodiments, the cation associated with the at least one carboxylate salt is selected from the group consisting of sodium salts, potassium salts, magnesium salts, calcium salts, and, in the case of more than one carboxylate salt per molecule, combinations thereof. In very specific embodiments, the cation associated with the at least one carboxylate salt is calcium.

In a very specific embodiment of the compound represented by Formula (1), each occurrence of $R^1$ is n-heptadecyl ($-(CH_2)_{16}CH_3$), each occurrence of $R^2$ is tetramethylene ($-(CH_2)_4-$), and n is, on average, 4 to 12.

In another very specific embodiment, the composition comprises a partially calcium saponified derivative of the compound represented by Formula (1) wherein each occurrence of $R^1$ is n-heptadecyl ($-(CH_2)_{16}CH_3$), each occurrence of $R^2$ is tetramethylene ($-(CH_2)_4-$), and n is, on average, 4 to 12.

The composition comprises the compound represented by Formula (1), the partially saponified derivative thereof, or the combination thereof in an amount of 0.01 to 2 part by weight, based on 100 parts by weight of the poly(alkylene terephthalate). Within this range, the amount can be 0.1 to 0.8 part by weight, specifically 0.3 to 0.8 part by weight.

The composition excludes copolymers of monomers comprising an unsubstituted or substituted styrene, and an unsaturated nitrile. Inclusion of such copolymers detracts from the desired surface smoothness of parts injection molded from the composition. Examples of the extruded copolymers include styrene-acrylonitrile copolymers, and ortho-methylstyrene-acrylonitrile copolymers. Additional examples can be found in U.S. Patent Application Publication No. US 2008/0227920 A1 of Weber et al., in particular the description of component C of that reference.

The composition can, optionally, further comprise a metal hypophosphite. As demonstrated in the working examples below, adding a metal hypophosphite to the composition further reduces outgassing of the composition and thereby further improves high temperature operation of reflectors formed by coating a reflective layer on a substrate formed from the composition. In some embodiments, the metal hypophosphite is selected from the group consisting of calcium hypophosphite, aluminum hypophosphite, sodium hypophosphite, and combinations thereof.

When present, the metal hypophosphite is used in an amount of 0.01 to 2 parts by weight, based on 100 parts by weight of the poly(alkylene terephthalate). Within this range, the metal hypophosphite amount can be 0.05 to 1 part by weight, specifically 0.2 to 0.6 part by weight.

In a specific embodiment of the composition, the poly(alkylene terephthalate) is selected from the group consisting of poly(ethylene terephthalate), poly(butylene terephthalate), and combinations thereof; each occurrence of $R^1$ is n-heptadecyl ($-(CH_2)_{16}CH_3$); each occurrence of $R^2$ is tetramethylene ($-(CH_2)_4-$); n is, on average, 4 to 12; and the composition comprises 0.1 to 0.8 parts by weight of the compound represented by Formula (1), the partially saponified derivative thereof, or the combination thereof. The composition can, optionally, further comprise 0.05 to 1 part by weight of a metal hypophosphite selected from the group consisting of calcium hypophosphite, aluminum hypophosphite, sodium hypophosphite, and combinations thereof.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 220 to 280° C., specifically 230 to 270° C.

The composition is useful for forming articles. Suitable methods of forming articles from the composition include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

The composition is particularly useful for injection molding substrates for automotive headlight reflectors and automotive headlight bezels. Thus, in some embodiments, an article formed from the composition comprises a first layer comprising the composition, and a reflective metal layer in contact with a surface of the first layer.

The invention includes at least the following embodiments.

Embodiment 1

A composition comprising: 100 parts by weight of poly(alkylene terephthalate); and 0.2 to 1 parts by weight of a compound represented by Formula (1), a partially saponified derivative thereof, or a combination thereof,

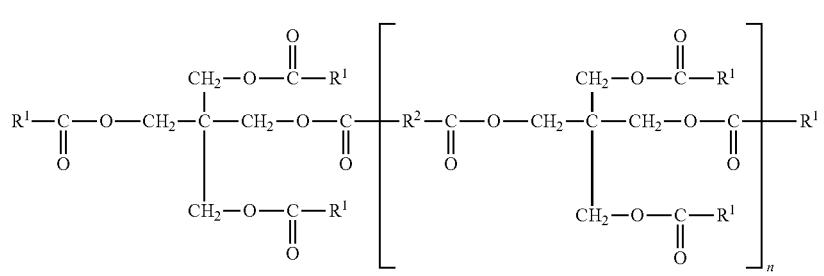

(1)

wherein each occurrence of $R^1$ is independently $C_6$-$C_{36}$ hydrocarbyl; each occurrence of $R^2$ is independently $C_1$-$C_{10}$ hydrocarbylene; and n is, on average, 1 to 15; and wherein the composition excludes copolymers of monomers comprising an unsubstituted or substituted styrene, and an unsaturated nitrile.

Embodiment 2

The composition of embodiment 1, wherein the poly(alkylene terephthalate) comprises alkylene groups selected from the group consisting of ethylene, 1,3-propylene, 1,4-butylene, 1,5-pentylene, 1,6-hexylene, 1,4-cyclohexylene, 1,4-cyclohexanedimethylene, and combinations thereof.

Embodiment 3

The composition of embodiment 1, wherein the poly(alkylene terephthalate) is selected from the group consisting of poly(ethylene terephthalate), poly(butylene terephthalate), and combinations thereof.

Embodiment 4

The composition of embodiment 1, wherein the poly(alkylene terephthalate) comprises poly(butylene terephthalate).

Embodiment 5

The composition of any one of embodiments 1-4, wherein each occurrence of $R^2$ is independently dimethylene ($-(CH_2)_2-$), trimethylene ($-(CH_2)_3-$), tetramethylene ($-(CH_2)_4-$), pentamethylene ($-(CH_2)_5-$), hexamethylene ($-(CH_2)_6-$), heptamethylene ($-(CH_2)_7-$), octamethylene ($-(CH_2)_8-$), nonamethylene ($-(CH_2)_9-$), or decamethylene ($-(CH_2)_{10}-$).

Embodiment 6

The composition of any one of embodiments 1-4, wherein each occurrence of $R^2$ is tetramethylene ($-(CH_2)_4-$).

Embodiment 7

The composition of any one of embodiments 1-6, wherein each occurrence of $R^1$ is independently $C_{16}$-$C_{36}$ alkyl.

Embodiment 8

The composition of any one of embodiments 1-6, wherein each occurrence of $R^1$ is n-heptadecyl ($-(CH_2)_{16}CH_3$).

Embodiment 9

The composition of any one of embodiments 1-8, wherein n is, on average, 4 to 12.

Embodiment 10

The composition of any one of embodiments 1-9, comprising the partially saponified derivative of the compound represented by Formula (1), wherein the partially saponified derivative is a sodium salt, a potassium salt, a magnesium salt, a calcium salt, or a combination thereof.

Embodiment 11

The composition of embodiment 10, wherein the partially saponified derivative comprises a calcium salt.

Embodiment 12

The composition of any one of embodiments 1-4, comprising the compound represented by Formula (1) wherein each occurrence of $R^1$ is n-heptadecyl ($-(CH_2)_{16}CH_3$), each occurrence of $R^2$ is tetramethylene ($-(CH_2)_4-$), and n is, on average, 4 to 12.

Embodiment 13

The composition of any one of embodiments 1-4, comprising a partially calcium saponified derivative of the compound represented by Formula (1) wherein each occurrence of $R^1$ is n-heptadecyl ($-(CH_2)_{16}CH_3$), each occurrence of $R^2$ is tetramethylene ($-(CH_2)_4-$), and n is, on average, 4 to 12.

Embodiment 14

The composition of any one of embodiments 1-13, further comprising 0.1 to 2 parts by weight of a metal hypophosphite selected from the group consisting of calcium hypophosphite, aluminum hypophosphite, sodium hypophosphite, and combinations thereof.

Embodiment 15

The composition of embodiment 1, wherein the poly(alkylene terephthalate) is selected from the group consisting of poly(ethylene terephthalate), poly(butylene terephthalate), and combinations thereof; wherein each occurrence of $R^1$ is n-heptadecyl ($-(CH_2)_{16}CH_3$); wherein each occurrence of $R^2$ is tetramethylene ($-(CH_2)_4-$); wherein n is, on average, 4 to 12; and wherein the composition comprises 0.1 to 0.8 parts by weight of the compound represented by Formula (1), the partially saponified derivative thereof, or the combination thereof.

Embodiment 16

The composition of embodiment 15, further comprising 0.05 to 1 part by weight of a metal hypophosphite selected from the group consisting of calcium hypophosphite, aluminum hypophosphite, sodium hypophosphite, and combinations thereof.

Embodiment 17

An article comprising the composition of any of embodiments 1-16.

Embodiment 18

The article of embodiment 17, comprising a first layer comprising the composition of any of embodiments 1-16, and a reflective metal layer in contact with a surface of the first layer.

Embodiment 19

The article of embodiment 17 or 18, selected from automotive headlight reflectors and automotive headlight bezels.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1 and 2, Comparative Examples 1-17

Components used to prepare compositions are summarized in Table 1.

TABLE 1

| Component | Description |
|---|---|
| PBT-1 | Poly(1,4-butylene terephthalate), CAS Reg. No. 26062-94-2, having an intrinsic viscosity of about 0.85 deciliter per gram, measured at 23° C. in 60:40 weight/weight phenol/tetrachloroethane; obtained as PBT 1200-211F Resin from Chang Chun Plastics Co., Ltd. |
| PBT-2 | Poly(1,4-butylene terephthalate), CAS Reg. No. 26062-94-2, having an intrinsic viscosity of about 1.26 deciliter per gram, measured at 23° C. in 60:40 weight/weight phenol/tetrachloroethane; obtained as 1100-211X from Chang Chun Plastics Co., Ltd. |
| PBT-3 | Poly(1,4-butylene terephthalate), CAS Reg. No. 26062-94-2, having an intrinsic viscosity of about 0.736 to 0.765 deciliter per gram, measured at 30° C. in 60:40 weight/weight phenol/tetrachloroethane; obtained as 1100-211D from Chang Chun Plastics Co., Ltd. |
| PET-1 | Poly(ethylene terephthalate), CAS Reg. No. 25038-59-9, having an intrinsic viscosity of 0.56 deciliter per gram, measured at 23° C. in 60:40 weight/weight phenol/tetrachloroethane; obtained as FC-03-56 from Foshan Plastics Group Co., Ltd. |
| Antioxidant | Tetrakis[methylene-3-(3',5'-di-t-butyl-4-hydroxyphenyl)-propionate]methane, CAS Reg. No. 6683-19-8; obtained as EVERNOX ™ 10 from Everspring Chemicals Co., Ltd. |
| Na Montanate | Sodium Montanate, CAS Reg. No. 25728-82-9; obtained as LICOMONT ™ NaV 101 from Clariant. |
| PETS | Pentaerythritol tetrastearate, CAS Reg. No. 115-83-3; obtained from FACI. |
| PAO-1 | Poly(1-decene), CAS Reg. No. 68037-01-4, having a kinematic viscosity of 4.0 centistokes at 100° C.; obtained at DURASYN ™ 164 from INTEOS Oligomers. |
| PAO-2 | Poly(1-decene), CAS Reg. No. 68037-01-4, having a kinematic viscosity of 5.8 centistokes at 100° C.; obtained as DURASYN ™ 166 from INEOS Oligomers. |
| HDPE | High density polyethylene, CAS Reg. No. 9002-88-4; obtained as MARLEX ™ HXM 50100 from Chevron Phillips Chemical Company LLC. |
| G15 | Hydrogenated castor oil; obtained as LOXIOL ™ G15 from Emery Oleochemicals. |
| G32 | Stearyl stearate; obtained as LOXIOL ™ G32 from Emery Oleochemicals. |
| G47 | Stearyl behenate; obtained as LOXIOL ™ G47 from Emery Oleochemicals. |
| G70S | Copolymer of hexanedioic acid and 2,2-bis(octadecanoyloxymethyl)-1,3-propanediol; obtained as LOXIOL ™ G70S from Emery Oleochemicals. |
| G78 | Partially calcium saponified copolymer of hexanedioic acid and 2,2-bis(octadecanoyloxymethyl)-1,3-propanediol; obtained as LOXIOL ™ G78 from Emery Oleochemicals. |
| 2899 | Dipentaerythritol hexastearate; obtained as LOXIOL ™ 2899 from Emery Oleochemicals. |
| P1206 | Glyceryl 1,3-distearate; obtained as LOXIOL ™ P1206 from Emery Oleochemicals. |
| VPG 861 | Pentaerythritol tetrastearate; obtained as LOXIOL ™ VPG 861 from Emery Oleochemicals. |
| VPG 2571 | Dipentaerythritol stearate; obtained as LOXIOL ™ VPG 2571 from Emery Oleochemicals. |
| VPN 963 | A fatty acid ester wax; obtained as LOXIOL ™ VPN 963 from Emery Oleochemicals. |
| CE2 | $C_{24-36}$ alpha-olefin copolymer with maleic anhydride, CAS Reg. No. 68989-34-4; obtained as LICOLUB ™ CE2 from Clariant. |
| OHC | $Ca^{2+}$ 12-hydroxyoctadecanoate, CAS Reg. No. 3159-62-4; obtained from Dainichi Chemical Industry Co., Ltd. |
| EPL-8 | Ethylene bis(stearamide), CAS Reg. No. 110-30-5, and fatty acid polyamides; obtained as DAIWAX ™ EPL-8 from Dainichi Chemical Industry Co., Ltd. |

TABLE 1-continued

| Component | Description |
|---|---|
| EPL-25 | Fatty acid polyamides and fatty acid bis-amides; obtained as DAIWAX ™ EPL-25 from Dainichi Chemical Industry Co., Ltd. |
| Bisamide | Ethylene bis(stearamide), CAS Reg. No. 110-30-5; obtained from Nippon Kasei Chemical. |
| LDPE | Low density polyethylene (LDPE), CAS Reg. No. 9002-88-4; obtained as NUC8009 from Nippon Unicar Co., Ltd. |
| $Ca(H_2PO_2)_2$ | Calcium hypophosphite, CAS Reg. No. 7789-79-9; obtained from Omichi Seiyaku Co., Ltd. |

To prepare the compositions, all the ingredients were pre-blended, then added to the feed throat of a twin-screw extruder having a 44 millimeter internal diameter. The composition was melt-kneaded using a throughput of about 160 kilograms per hour, a barrel temperature of 260° C., and a screw speed of 200 revolutions per minute. Three millimeter diameter strands were extruded through the die and cooled in a water bath prior to pelletizing. Pellets were dried at 120° C. for 2 hours prior to use for injection molding.

Test specimens were injection molded in accordance with corresponding ASTM methods using a 100 ton injection molding machine operating at a melt temperature of 250° C. and a mold temperature of 80° C.

Properties were determined using the procedures and conditions summarized in Table 2, where "HDT" is heat deflection temperature, "MFI" is melt flow index, "SG" is specific gravity, "kg" is kilograms, "cm" is centimeters, and "min" is minutes.

TABLE 2

| Property | Standard | Conditions | Specimen Type | Units |
|---|---|---|---|---|
| Notched Izod | ASTM D256-10 | 23° C., 3.2 mm | Bar-63.5 × 12.7 × 3.2 mm | kg-cm/cm |
| Tensile Strength | ASTM D638-10 | Test speed 10 mm/min; gage length 50 mm | Tensile Type I Bar | $kg/cm^2$ |
| Flexural Strength | ASTM D790-10 | Test speed 2.5 mm/min | 3.2 × 12.7 × 6.4 mm | $kg/cm^2$ |
| Flexural Modulus | ASTM D790-10 | Test speed 2.5 mm/min | 3.2 × 12.7 × 6.4 mm | $kg/cm^2$ |
| HDT | ASTM D648-07 | 4.6 kg load | 3.2 × 12.7 × 6.4 mm | ° C. |
| MFI | ASTM D1238-13 | 250° C., 2.16 kg | Granule | g/10 min |
| SG | ASTM D792-13 | Method A-Water | | (none) |

Mold release of the compositions was tested by molding 100×50×3 millimeter plaques at a resin temperature of 250° C. and a mold temperature of 80° C. using a 100 ton molding machine. The tool (mold) was highly polished with #4000 abrasive prior to molding. After molding, the surface of two plaques for each composition was visually inspected and rated based on the size of the swirl mark observed on the surface of each plaque. A rating of "−−−" indicates severe swirling, "0" indicates moderate swirling, and a rating of "++" indicates no swirl mark on the surface of the plaque.

Surface defects of the compositions after exposure to high temperatures were evaluated using molded plaques having dimensions of 100×50×3 millimeters. The plaques were heated to 160° C. or 180° C. for 4 hours or 180° C. for 24 hours, in an outgas oven. The surface of two plaques for each composition was visually inspected after cooling, and the surface defects of the surface were rated. The score "−−−" indicates severe surface defects, "0" indicates moderate surface defects, and "++" indicates no surface defects at all.

Compositions and properties are summarized in the following Tables, where component amounts are expressed in parts by weight based on 100 parts by weight poly(alkylene terephthalate). The poly(alkyene terephthalate)s are PBT-1, PBT-2, and PET-1.

As illustrated by inventive Examples 1 and 2 and Comparative Examples 1 to 14 shown in Table 3, polyester compositions having fixed contents of poly(butylene terephthalate) (PBT) at 100 parts by weight and mold release agent at 0.5 parts by weight can achieve comparable mechanical properties, including Izod impact strength (3 to 4.5 kg-cm/cm), tensile strength (535 to 580 $kg/cm^2$), flexural strength (840 to 870 $kg/cm^2$), HDT (167 to 176° C.), and melt flow index (16.7 to 21 g/10 minutes) irrespective of the mold release agent composition. Comparative Examples 1 to 14 all failed to achieve the combination of acceptable mold release (indicated by at least a rating of "+") and an acceptably low level of surface defects (indicated by a rating of at least "+"). The compositions of inventive Examples 1 and 2, however, include mold release agents which allow for compositions having good mold release, both achieving a rating of "+" upon visual inspection of the surface of the molded plaques, and having minimal surface defects, both achieving a rating of "+" after heating to 160° C. for 4 hours in an outgas oven. Comparative Examples 15 and 16 demonstrate that increasing the amount of HDPE mold release agent to 1.01 parts by weight or LDPE mold release agent to 1.52 parts by weight does not achieve the desired combination of good mold release properties and no surface defects. Comparative Example 17 demonstrates that incorporating a combination of PETS and PAO-2 at a total of 0.5 parts by weight leads to a composition exhibiting substantial surface defects.

TABLE 3

| | Ex. 1 | Ex. 2 | C. Ex. 1 | C. Ex. 2 | C. Ex. 3 |
|---|---|---|---|---|---|
| | COMPOSITIONS | | | | |
| PBT-2 | 100.00 | 100.00 | 100.00 | 100.00 | 100.00 |
| Antioxidant | 0.06 | 0.06 | 0.06 | 0.06 | 0.06 |
| Na Montanate | 0.00 | 0.00 | 0.00 | 0.50 | 0.00 |
| PETS | 0.00 | 0.00 | 0.00 | 0.00 | 0.50 |
| PAO-1 | 0.00 | 0.00 | 0.00 | 0.00 | 0.00 |

TABLE 3-continued

| | | | | | |
|---|---|---|---|---|---|
| G15 | 0.00 | 0.00 | 0.00 | 0.00 | 0.00 |
| G32 | 0.00 | 0.00 | 0.00 | 0.00 | 0.00 |
| G47 | 0.00 | 0.00 | 0.00 | 0.00 | 0.00 |
| G70S | 0.50 | 0.00 | 0.00 | 0.00 | 0.00 |
| G78 | 0.00 | 0.50 | 0.00 | 0.00 | 0.00 |
| 2899 | 0.00 | 0.00 | 0.00 | 0.00 | 0.00 |
| P1206 | 0.00 | 0.00 | 0.00 | 0.00 | 0.00 |
| VPG 861 | 0.00 | 0.00 | 0.00 | 0.00 | 0.00 |
| VPG 2571 | 0.00 | 0.00 | 0.00 | 0.00 | 0.00 |
| VPN 963 | 0.00 | 0.00 | 0.00 | 0.00 | 0.00 |
| PAO-2 | 0.00 | 0.00 | 0.00 | 0.00 | 0.00 |
| HDPE | 0.00 | 0.00 | 0.00 | 0.00 | 0.00 |
| LDPE | 0.00 | 0.00 | 0.00 | 0.00 | 0.00 |
| PROPERTIES | | | | | |
| Notched Izod (kg-cm/cm) | 3.8 | 3.4 | 4.3 | 3.6 | 4.4 |
| Tensile strength (kg/cm$^2$) | 550 | 551 | 566 | 569 | 558 |
| Flexural strength (kg/cm$^2$) | 846 | 850 | 885 | 866 | 855 |
| Flexural modulus (kg/cm$^2$) | 25940 | 25907 | 26362 | 26163 | 25944 |
| HDT (° C.) | 176 | 174 | 176 | 176 | 173 |
| MFI (g/10 min) | 16.7 | 17.1 | 17.3 | 19.1 | 16.9 |
| SG | 1.31 | 1.31 | 1.31 | 1.31 | 1.31 |
| Mold release, swirl visual inspec. | + | + | — | 0 | 0 |
| Surface defects, 160° C./4 hours | + | + | ++ | + | — |

| | C. Ex. 4 | C. Ex. 5 | C. Ex. 6 | C. Ex. 7 | C. Ex. 8 |
|---|---|---|---|---|---|
| COMPOSITIONS | | | | | |
| PBT-2 | 100.00 | 100.00 | 100.00 | 100.00 | 100.00 |
| Antioxidant | 0.06 | 0.06 | 0.06 | 0.06 | 0.06 |
| Na Montanate | 0.00 | 0.00 | 0.00 | 0.00 | 0.00 |
| PETS | 0.00 | 0.00 | 0.00 | 0.00 | 0.00 |
| PAO-1 | 0.50 | 0.00 | 0.00 | 0.00 | 0.00 |
| G15 | 0.00 | 0.50 | 0.00 | 0.00 | 0.00 |
| G32 | 0.00 | 0.00 | 0.50 | 0.00 | 0.00 |
| G47 | 0.00 | 0.00 | 0.00 | 0.50 | 0.00 |
| G70S | 0.00 | 0.00 | 0.00 | 0.00 | 0.00 |
| G78 | 0.00 | 0.00 | 0.00 | 0.00 | 0.00 |
| 2899 | 0.00 | 0.00 | 0.00 | 0.00 | 0.50 |
| P1206 | 0.00 | 0.00 | 0.00 | 0.00 | 0.00 |
| VPG 861 | 0.00 | 0.00 | 0.00 | 0.00 | 0.00 |
| VPG 2571 | 0.00 | 0.00 | 0.00 | 0.00 | 0.00 |
| VPN 963 | 0.00 | 0.00 | 0.00 | 0.00 | 0.00 |
| PAO-2 | 0.00 | 0.00 | 0.00 | 0.00 | 0.00 |
| HDPE | 0.00 | 0.00 | 0.00 | 0.00 | 0.00 |
| LDPE | 0.00 | 0.00 | 0.00 | 0.00 | 0.00 |
| PROPERTIES | | | | | |
| Notched Izod (kg-cm/cm) | 4.1 | 3.6 | 3.3 | 3.7 | 3.5 |
| Tensile strength (kg/cm$^2$) | 537 | 563 | 557 | 554 | 557 |
| Flexural strength (kg/cm$^2$) | 845 | 865 | 849 | 858 | 844 |
| Flexural modulus (kg/cm$^2$) | 25665 | 26280 | 25943 | 26297 | 26094 |
| HDT (° C.) | 175 | 176 | 176 | 174 | 173 |
| MFI (g/10 min) | 19.4 | 17.3 | 17.2 | 17.0 | 17.4 |
| SG | 1.31 | 1.31 | 1.31 | 1.31 | 1.31 |
| Mold release, swirl visual inspec. | + | — | — | — | ++ |
| Surface defects, 160° C./4 hours | + | + | + | — | — |

| | C. Ex. 9 | C. Ex. 10 | C. Ex. 11 | C. Ex. 12 | C. Ex. 13 |
|---|---|---|---|---|---|
| COMPOSITIONS | | | | | |
| PBT-2 | 100.00 | 100.00 | 100.00 | 100.00 | 100.00 |
| Antioxidant | 0.06 | 0.06 | 0.06 | 0.06 | 0.06 |
| Na Montanate | 0.00 | 0.00 | 0.00 | 0.00 | 0.00 |
| PETS | 0.00 | 0.00 | 0.00 | 0.00 | 0.00 |
| PAO-1 | 0.00 | 0.00 | 0.00 | 0.00 | 0.00 |
| G15 | 0.00 | 0.00 | 0.00 | 0.00 | 0.00 |
| G32 | 0.00 | 0.00 | 0.00 | 0.00 | 0.00 |
| G47 | 0.00 | 0.00 | 0.00 | 0.00 | 0.00 |
| G70S | 0.00 | 0.00 | 0.00 | 0.00 | 0.00 |
| G78 | 0.00 | 0.00 | 0.00 | 0.00 | 0.00 |
| 2899 | 0.00 | 0.00 | 0.00 | 0.00 | 0.00 |
| P1206 | 0.50 | 0.00 | 0.00 | 0.00 | 0.00 |
| VPG 861 | 0.00 | 0.50 | 0.00 | 0.00 | 0.00 |
| VPG 2571 | 0.00 | 0.00 | 0.50 | 0.00 | 0.00 |
| VPN 963 | 0.00 | 0.00 | 0.00 | 0.50 | 0.00 |
| PAO-2 | 0.00 | 0.00 | 0.00 | 0.00 | 0.50 |
| HDPE | 0.00 | 0.00 | 0.00 | 0.00 | 0.00 |

TABLE 3-continued

|  | | | | | |
|---|---|---|---|---|---|
| LDPE | 0.00 | 0.00 | 0.00 | 0.00 | 0.00 |
| PROPERTIES | | | | | |
| Notched Izod (kg-cm/cm) | 3.6 | 3.8 | 4.1 | 3.4 | 3.7 |
| Tensile strength (kg/cm$^2$) | 566 | 561 | 578 | 565 | 576 |
| Flexural strength (kg/cm$^2$) | 841 | 842 | 846 | 857 | 873 |
| Flexural modulus (kg/cm$^2$) | 25854 | 25622 | 26030 | 25842 | 25870 |
| HDT (° C.) | 173 | 173 | 174 | 170 | 175 |
| MFI (g/10 min) | 17.9 | 17.9 | 17.9 | 17.9 | 21.0 |
| SG | 1.31 | 1.31 | 1.31 | 1.31 | 1.31 |
| Mold release, swirl visual inspec. | 0 | + | + (hazy) | + (hazy) | + |
| Surface defects, 160° C./4 hours | + | — | + | — | — |

|  | C. Ex. 14 | C. Ex. 15 | C. Ex. 16 | C. Ex. 17 |
|---|---|---|---|---|
| COMPOSITIONS | | | | |
| PBT-2 | 100.00 | 100.00 | 100.00 | 100.00 |
| Antioxidant | 0.06 | 0.06 | 0.06 | 0.06 |
| Na Montanate | 0.00 | 0.00 | 0.00 | 0.00 |
| PETS | 0.00 | 0.00 | 0.00 | 0.20 |
| PAO-1 | 0.00 | 0.00 | 0.00 | 0.00 |
| G15 | 0.00 | 0.00 | 0.00 | 0.00 |
| G32 | 0.00 | 0.00 | 0.00 | 0.00 |
| G47 | 0.00 | 0.00 | 0.00 | 0.00 |
| G70S | 0.00 | 0.00 | 0.00 | 0.00 |
| G78 | 0.00 | 0.00 | 0.00 | 0.00 |
| 2899 | 0.00 | 0.00 | 0.00 | 0.00 |
| P1206 | 0.00 | 0.00 | 0.00 | 0.00 |
| VPG 861 | 0.00 | 0.00 | 0.00 | 0.00 |
| VPG 2571 | 0.00 | 0.00 | 0.00 | 0.00 |
| VPN 963 | 0.00 | 0.00 | 0.00 | 0.00 |
| PAO-2 | 0.00 | 0.00 | 0.00 | 0.30 |
| HDPE | 0.50 | 1.01 | 0.00 | 0.00 |
| LDPE | 0.00 | 0.00 | 1.52 | 0.00 |
| PROPERTIES | | | | |
| Notched Izod (kg-cm/cm) | 4.0 | 4.5 | 5.6 | 4.9 |
| Tensile strength (kg/cm$^2$) | 565 | 564 | 545 | 551 |
| Flexural strength (kg/cm$^2$) | 870 | 852 | 830 | 839 |
| Flexural modulus (kg/cm$^2$) | 26087 | 25804 | 25203 | 25808 |
| HDT (° C.) | 171 | 167 | 171 | 172 |
| MFI (g/10 mm) | 17.8 | 16.7 | 16.4 | 17.2 |
| SG | 1.31 | 1.3 | 1.3 | 1.31 |
| Mold release, swirl visual inspec. | — | — | — | ++ |
| Surface defects, 160° C./4 hours | + | + | + | — |

Examples 3 and 4, Comparative Examples 18-26

Inventive Examples 3 and 4 and Comparative Examples 18 to 26, shown in Table 4, illustrate compositions including both poly(butylene terephthalate) at a fixed amount of 89.94 parts by weight and poly(ethylene terephthalate) at a fixed amount of 10.06 parts by weight. Comparative Example 18 did not include a mold release agent and demonstrated extremely poor mold release properties, achieving a rating of "– – –" in the swirl visual inspection. Comparative Example 19, incorporating sodium montanate, exhibited relatively small surface defects in this test, but as shown in the following set of examples, compositions containing sodium montanate left deposits on the molding tool after five hours of molding. Comparative Examples 20 to 26 all showed poor mold release with ratings ranging from "–" to "– – –". Furthermore, the compositions of Comparative Examples 20, 21, 24, and 25 showed significant surface defects upon heating at 160° C. or 180° C. for 4 hours. The compositions of inventive Examples 3 and 4, however, included mold release agents which provided good mold release, both achieving a rating of "0" in the swirl visual inspection test, and having minimal surface defects, achieving ratings of "+" or "0" after heating to 160° C. or 180° C. for 4 hours in an outgas oven. The composition of inventive Example 3 was further observed to have minimal surface defects after heating to 180° C. for 24 hours.

TABLE 4

|  | Ex. 3 | Ex. 4 | C. Ex. 18 | C. Ex. 19 | C. Ex. 20 |
|---|---|---|---|---|---|
| COMPOSITIONS | | | | | |
| PBT-2 | 89.94 | 89.94 | 89.94 | 89.94 | 89.94 |
| PET-1 | 10.06 | 10.06 | 10.06 | 10.06 | 10.06 |
| Antioxidant | 0.06 | 0.06 | 0.06 | 0.06 | 0.06 |
| Na Montanate | 0.00 | 0.00 | 0.00 | 0.50 | 0.00 |
| PAO-1 | 0.00 | 0.00 | 0.00 | 0.00 | 0.50 |
| G70S | 0.50 | 0.00 | 0.00 | 0.00 | 0.00 |
| G78 | 0.00 | 0.50 | 0.00 | 0.00 | 0.00 |

TABLE 4-continued

| | | | | | |
|---|---|---|---|---|---|
| P1206 | 0.00 | 0.00 | 0.00 | 0.00 | 0.00 |
| CE2 | 0.00 | 0.00 | 0.00 | 0.00 | 0.00 |
| OHC | 0.00 | 0.00 | 0.00 | 0.00 | 0.00 |
| EPL-8 | 0.00 | 0.00 | 0.00 | 0.00 | 0.00 |
| EPL-25 | 0.00 | 0.00 | 0.00 | 0.00 | 0.00 |
| Bisamide | 0.00 | 0.00 | 0.00 | 0.00 | 0.00 |
| PROPERTIES | | | | | |
| Notched Izod (kg-cm/cm) | 3.4 | 3.7 | 2.9 | 3.0 | 3.2 |
| Tensile strength (kg/cm$^2$) | 579 | 583 | 588 | 580 | 580 |
| Flexural strength (kg/cm$^2$) | 894 | 903 | 901 | 914 | 905 |
| Flexural modulus (kg/cm$^2$) | 27249 | 27378 | 27315 | 27536 | 27460 |
| HDT (° C.) | 174 | 177 | 179 | 170 | 175 |
| MFI (g/10 min) | 21.2 | 24.5 | 23.0 | 33.2 | 25.2 |
| SG | 1.32 | 1.32 | 1.32 | 1.32 | 1.32 |
| Mold release, swirl visual inspec. | 0 | 0 | — | 0 | — |
| Surface defects, 160° C./4 hours | + | + | + | + | — |
| Surface defects, 180° C./4 hours | + | 0 | + | + | — |
| Surface defects, 180° C./24 hours | + | — | + | + | * |

| | C. Ex. 21 | C. Ex. 22 | C. Ex. 23 | C. Ex. 24 | C. Ex. 25 |
|---|---|---|---|---|---|
| COMPOSITIONS | | | | | |
| PBT-2 | 89.94 | 89.94 | 89.94 | 89.94 | 89.94 |
| PET-1 | 10.06 | 10.06 | 10.06 | 10.06 | 10.06 |
| Antioxidant | 0.06 | 0.06 | 0.06 | 0.06 | 0.06 |
| Na Montanate | 0.00 | 0.00 | 0.00 | 0.00 | 0.00 |
| PAO-1 | 0.00 | 0.00 | 0.00 | 0.00 | 0.00 |
| G70S | 0.00 | 0.00 | 0.00 | 0.00 | 0.00 |
| G78 | 0.00 | 0.00 | 0.00 | 0.00 | 0.00 |
| P1206 | 0.50 | 0.00 | 0.00 | 0.00 | 0.00 |
| CE2 | 0.00 | 0.50 | 0.00 | 0.00 | 0.00 |
| OHC | 0.00 | 0.00 | 0.50 | 0.00 | 0.00 |
| EPL-8 | 0.00 | 0.00 | 0.00 | 0.50 | 0.00 |
| EPL-25 | 0.00 | 0.00 | 0.00 | 0.00 | 0.50 |
| Bisamide | 0.00 | 0.00 | 0.00 | 0.00 | 0.00 |
| PROPERTIES | | | | | |
| Notched Izod (kg-cm/cm) | 3.0 | 3.0 | 2.7 | 3.4 | 2.9 |
| Tensile strength (kg/cm$^2$) | 582 | 585 | 576 | 573 | 580 |
| Flexural strength (kg/cm$^2$) | 906 | 901 | 908 | 899 | 887 |
| Flexural modulus (kg/cm$^2$) | 26967 | 26807 | 27025 | 27142 | 26902 |
| HDT (° C.) | 175 | 173 | 174 | 177 | 173 |
| MFI (g/10 min) | 23.4 | 21.3 | 25.3 | 22.7 | 22.9 |
| SG | 1.32 | 1.32 | 1.32 | 1.32 | 1.32 |
| Mold release, swirl visual inspec. | — | — | — | — | — |
| Surface defects, 160° C./4 hours | — | + | + | — | — |
| Surface defects, 180° C./4 hours | — | 0 | 0 | — | — |
| Surface defects, 180° C./24 hours | * | * | * | * | * |

| | C. Ex. 26 |
|---|---|
| COMPOSITIONS | |
| PBT-2 | 89.94 |
| PET-1 | 10.06 |
| Antioxidant | 0.06 |
| Na Montanate | 0.00 |
| PAO-1 | 0.00 |
| G70S | 0.00 |
| G78 | 0.00 |
| P1206 | 0.00 |
| CE2 | 0.00 |
| OHC | 0.00 |
| EPL-8 | 0.00 |
| EPL-25 | 0.00 |
| Bisamide | 0.50 |
| PROPERTIES | |
| Notched Izod (kg-cm/cm) | 2.8 |
| Tensile strength (kg/cm$^2$) | 575 |
| Flexural strength (kg/cm$^2$) | 879 |
| Flexural modulus (kg/cm$^2$) | 26936 |
| HDT (° C.) | 175 |
| MFI (g/10 min) | 22.8 |
| SG | 1.32 |

TABLE 4-continued

| | |
|---|---|
| Mold release, swirl visual inspec. | — |
| Surface defects, 160° C./4 hours | + |
| Surface defects, 180° C./4 hours | + |
| Surface defects, 180° C./24 hours | * |

*Test not conducted

Example 5, Comparative Examples 27-29

The compositions of inventive Example 5 and Comparative Examples 27 to 29 are shown in Table 5.

A short-shot injection molding study was performed to qualitatively evaluate deposits retained on a high gloss tool. The melt temperature was 260° C. and the temperature of the tool was 45° C. Compositions were molded for 5 hours without applying any back pressure. Compositions that did not result in visual depositions on the tool after 5 hours of molding are marked as "No". Conversely, compositions that resulted in deposits on the tool after 5 hours of molding are indicated as "Yes".

Inventive Example 5 demonstrates the inclusion of a preferred mold release agent further allows the composition to not leave any deposits on the tool after 5 hours of molding in a short-shot injection molding study. In contrast, the composition of Comparative Example 27, including 0.5 part by weight of sodium montanate, did result in deposits on the tool after 5 hours of molding in a short-shot injection molding study. Comparative Examples 28 and 29, incorporating 0.35 and 0.25 part by weight of sodium montanate, respectively, resulted in deposits on the tool after 5 hours of molding.

TABLE 5

| | Ex. 5 | C. Ex. 27 | C. Ex. 28 | C. Ex. 29 |
|---|---|---|---|---|
| | COMPOSITIONS | | | |
| PBT-1 | 100.00 | 100.00 | 100.00 | 100.00 |
| Antioxidant | 0.06 | 0.06 | 0.06 | 0.06 |
| Na Montanate | 0.00 | 0.50 | 0.35 | 0.25 |
| G70S | 0.50 | 0.00 | 0.00 | 0.00 |
| | PROPERTY | | | |
| Deposit on mold after 5 hours molding? | No | Yes | Yes | Yes |

Example 6, Comparative Example 30

These examples illustrate that an inventive composition exhibits less outgassing than a comparative composition. Haze values were determined on glass plates, which were placed on the top of a glass bottle containing 5 grams of pellets, and heated in an aluminum bath at 160° C. for 24 hours. After cooling the samples to room temperature, haze measurements were conducted on the glass plates using a haze meter (Murakami Color Research Laboratory, HM-150, JIS K7105) at 23° C. Compositions and haze results are presented in Table 6. The results show substantially lower haze (1.4%) for the inventive Example 6 composition relative to the Comparative Example 30 composition (9.5%).

TABLE 6

| | Ex. 6 | C. Ex. 30 |
|---|---|---|
| | COMPOSITIONS | |
| PBT-2 | 32.64 | 32.64 |
| PBT-3 | 67 | 67 |
| Antioxidant | 0.06 | 0.06 |
| Na Montanate | 0 | 0.35 |
| G70S | 0.35 | 0 |
| | PROPERTY | |
| Haze (%) | 1.4 | 9.5 |

The invention claimed is:

1. A composition comprising:
100 parts by weight of poly(alkylene terephthalate); and
0.01 to 2 parts by weight of a partially saponified derivative of a compound represented by Formula (1),

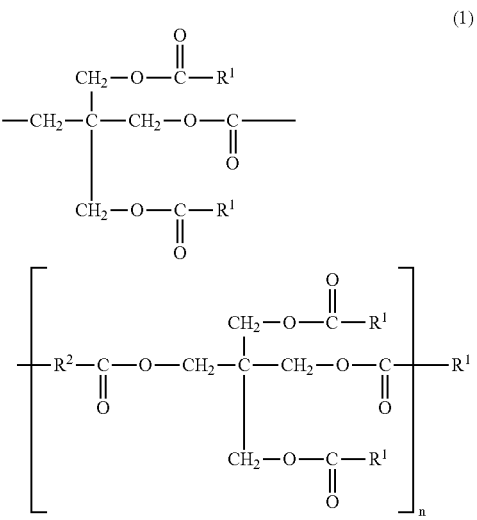

wherein each occurrence of $R^1$ is independently $C_6$-$C_{36}$ hydrocarbyl; each occurrence of $R^2$ is independently $C_1$-$C_{10}$ hydrocarbylene; and n is, on average, 1 to 15;
wherein the partially saponified derivative comprises a sodium salt, a potassium salt, a magnesium salt, a calcium salt, or a combination thereof; and
wherein the composition excludes copolymers of monomers comprising an unsubstituted or substituted styrene, and an unsaturated nitrile.

2. The composition of claim 1, wherein the poly(alkylene terephthalate) comprises groups derived from ethylene, 1,3-propylene, 1,4-butylene, 1,5-pentylene, 1,6-hexylene, 1,4-cyclohexylene, 1,4-cyclohexanedimethylene, or combinations thereof.

3. The composition of claim 1, wherein the poly(alkylene terephthalate) comprises poly(ethylene terephthalate), poly(butylene terephthalate), or combinations thereof.

4. The composition of claim 1, wherein the poly(alkylene terephthalate) comprises poly(butylene terephthalate).

5. The composition of claim 1, wherein each occurrence of $R^2$ is independently dimethylene (—$(CH_2)_2$—), trimethylene (—$(CH_2)_3$—), tetramethylene (—$(CH_2)_4$—), pentamethylene (—$(CH_2)_5$—), hexamethylene (—$(CH_2)_6$—), heptamethylene (—$(CH_2)_7$—), octamethylene (—$(CH_2)_8$—), nonamethylene (—$(CH_2)_9$—), or decamethylene (—$(CH_2)_{10}$—).

6. The composition of claim 1, wherein each occurrence of $R^2$ is tetramethylene.

7. The composition of claim 1, wherein each occurrence of $R^1$ is independently $C_{16}$-$C_{36}$ alkyl.

8. The composition of claim 1, wherein each occurrence of $R^1$ is n-heptadecyl.

9. The composition of claim 1, wherein n is, on average, 4 to 12.

10. The composition of claim 1, wherein the partially saponified derivative comprises a calcium salt.

11. The composition of claim 1, comprising the compound represented by Formula (1) wherein each occurrence of $R^1$ is n-heptadecyl, each occurrence of $R^2$ is tetramethylene, and n is, on average, 4 to 12.

12. The composition of claim 1, comprising a partially calcium saponified derivative of the compound represented by Formula (1) wherein each occurrence of $R^1$ is n-heptadecyl, each occurrence of $R^2$ is tetramethylene, and n is, on average, 4 to 12.

13. The composition of claim 1, further comprising 0.1 to 2 parts by weight of calcium hypophosphite, aluminum hypophosphite, sodium hypophosphite, or combinations thereof.

14. An article comprising the composition of claim 1.

15. The article of claim 14, comprising a first layer comprising the composition of claim 1, and a reflective metal layer in contact with a surface of the first layer.

16. The article of claim 14, wherein the article is an automotive headlight reflector or an automotive headlight bezel.

\* \* \* \* \*